(12) United States Patent
Dempster

(10) Patent No.: US 6,530,582 B2
(45) Date of Patent: Mar. 11, 2003

(54) RUNNER-MOUNTED PERSONAL VEHICLE

(75) Inventor: Kevin C. Dempster, Louisville, KY (US)

(73) Assignee: Zeffun, LLC, Louisville, KY (US)

( * ) Notice: Subject to any disclaimer, the term of this patent is extended or adjusted under 35 U.S.C. 154(b) by 0 days.

(21) Appl. No.: 09/757,167

(22) Filed: Jan. 9, 2001

(65) Prior Publication Data

US 2002/0089133 A1 Jul. 11, 2002

(51) Int. Cl.$^7$ .............................................. B62B 13/08
(52) U.S. Cl. ...................................... 280/22.1; 280/16
(58) Field of Search ............................ 280/22.1, 21.1, 280/25, 27, 14.28, 17, 14.26, 14.27, 28.11, 89, 93.513

(56) References Cited

U.S. PATENT DOCUMENTS

| 2,109,826 | A | * | 3/1938 | McCleary ..................... 280/16 |
| 2,547,210 | A | * | 4/1951 | Holbrook ................... 280/22.1 |
| 3,044,797 | A | * | 7/1962 | Borland ...................... 280/32.6 |
| 3,145,030 | A |   | 8/1964 | Millis |
| 3,479,980 | A | * | 11/1969 | Simmons ..................... 114/271 |
| 3,545,560 | A | * | 12/1970 | Fox ............................ 180/190 |
| 3,561,783 | A | * | 2/1971 | Ellett .......................... 280/16 |
| 3,583,507 | A |   | 6/1971 | Trautwein |
| 3,682,495 | A |   | 8/1972 | Zaimi |
| 3,862,766 | A | * | 1/1975 | Bogdanovich ............... 280/16 |
| 4,034,820 | A | * | 7/1977 | Barnhardt .................... 267/32 |
| 4,036,506 | A | * | 7/1977 | Scheib ....................... 280/22.1 |
| 4,101,142 | A | * | 7/1978 | Turner ......................... 280/16 |
| 4,165,087 | A | * | 8/1979 | Kagawa ....................... 280/16 |
| 4,335,891 | A | * | 6/1982 | Alley et al. .................. 224/921 |
| 4,413,832 | A | * | 11/1983 | Pendleton ..................... 280/18 |
| 4,440,408 | A | * | 4/1984 | Velman .................... 280/28.15 |
| 4,502,560 | A | * | 3/1985 | Hisatomi .................... 180/190 |
| 4,542,908 | A | * | 9/1985 | Muyskens ................. 280/22.1 |
| 4,603,870 | A | * | 8/1986 | Monreal ...................... 280/18 |
| 4,623,158 | A | * | 11/1986 | Monreal .................. 280/11.12 |
| 4,676,521 | A | * | 6/1987 | Monreal ..................... 280/606 |
| 4,796,902 | A | * | 1/1989 | Capra .......................... 280/16 |
| 5,308,095 | A | * | 5/1994 | Fabris et al. ............... 180/6.38 |
| 6,279,925 | B1 | * | 8/2001 | Miller ....................... 280/14.1 |
| 6,305,487 | B1 | * | 10/2001 | Montague ................... 180/348 |

FOREIGN PATENT DOCUMENTS

| CA | 945594 | 4/1974 | |
| FR | 2639842 | * 6/1990 | .......... A63H/17/00 |

* cited by examiner

Primary Examiner—Brian L. Johnson
Assistant Examiner—Kelly E Campbell
(74) Attorney, Agent, or Firm—James E. Cole; John F. Salazar; Middleton Reutlinger

(57) ABSTRACT

A steerable personal vehicle is providing for use on snow, land and water. The steerable personal vehicle has a steering assembly and a frame. The steering assembly and the frame are connected by a joint about which either may be rotated relative to the other. The frame includes a rider support on which a rider may be mounted in a generally prone position. The steering assembly provides for rotation about three main axes, so as to provide stability and handling. The vehicle is mounted on a plurality of runners that may be attached thereto by front and rear suspensions. The runners may be formed as snow skis, water skis or wheel-mounting tracks.

65 Claims, 9 Drawing Sheets

RUNNER-MOUNTED PERSONAL VEHICLE

BACKGROUND OF THE INVENTION

1. Technical Field

This invention relates to steerable vehicles for use on land and water. More particularly, this invention relates to a steerable personal vehicle which may ride on a plurality of runners.

2. Relevant Art

Current runner-mounted steerable personal vehicles, such as snowmobiles, snow sleds, water float sleds are provided with various rider-operated steering assemblies. The steering systems of such vehicles commonly include parallelogram steering linkages to provide adjustment to the camber angles of the runners, or skis. The camber angle of a runner refers to the angle of rotation of the runner relative to a vertical axis. For example, a skier may adjust the camber angles of his skis by turning the outside edge either upward or downward. Adjustment of the camber angle of a runner-mounted vehicle is important to the control and maneuverability of the vehicle. These parallelogram linkages usually include two transverse bars rotatably mounted to two vertical bars. The vertical bars are often shorter than the transverse bars. One of the transverse bars is typically affixed to the vehicle frame, while the other transverse bar is free to move. The free traverse bar is normally bound to each vertical bar only by its fastening point, and guided in movement by the other parts of the steering assembly. The fixed transverse bar supports a proportional amount of the total weight of the vehicle. The steering assemblies of such vehicles are designed to utilize the movement of these vertical and traverse bars. The fixed traverse bar is designed to flex, bend, or otherwise provide a non-rigid suspension in order to absorb shock transmitted from the terrain. When such a vertical bar flexes, an equal load is thereby distributed to the other vertical bar, but in an opposite direction. Similarly, when the free-moving transverse bar horizontally flexes, both of the vertical bars are thereby shifted from vertical alignment.

One of the drawbacks of such steering assemblies is that the parallelogram design does not lend itself to use in compact vehicles having low profiles. Indeed, the size, weight and complexity of such linkages make them inappropriate elements of a low-profile vehicle. Since the designs of current steering assemblies usually require the application of relatively large forces over short moment arms, these steering assemblies must include substantial structure in order to provide sufficient mechanical advantage. This substantial structure adds weight and complexity to the vehicle, thereby hindering the design of a compact personal vehicle.

It, therefore, is desirable to provide a steering assembly for a runner-mounted personal vehicle that provides for multi-axial steering of the vehicle, while also providing less size, weight and complexity than provided by current steering assemblies. It is also desirable to provide a runner-mounted personal vehicle, such as a sled, that is compact, lightweight and has a low profile.

SUMMARY OF THE INVENTION

It is an object of the present invention is to provide a steerable runner-mounted personal vehicle.

It is another object of the present invention is to provide a steerable runner-mounted personal vehicle having a multi-axial steering capability.

It is a further object of the present invention to provide a personal vehicle having a rider support that supports a rider in a prone position.

It is yet another object of the present invention to provide a steering assembly for a runner-mounted personal vehicle.

It is still a further object of the present invention to provide a sled mounted on a plurality of runners and being steerable about a plurality of axes.

More particularly, the present invention provides a runner-mounted personal vehicle, or sled, having a steering assembly operably connected to a frame. These two components are connected by a joint which allows rotation about multiple axes. The joint may include, for example, a universal joint, a constant velocity joint, or the like. A quick release device, such as a clevis separation pin, secures the frame to the joint, to thereby allowing quick separation of the steering assembly from the frame to facilitate transport of the vehicle when not in use.

The frame includes a rider support and a rear suspension. The rider support may carry a rider in a prone position, since the rider support may include a torso support, and a leg guard, which may include a thigh support, leg slings and shin supports. The rider support may allow the rider's body to envelope partially the frame so as to provide a low profile to the rider-mounted vehicle. The rear suspension may include at least one rear runner, as well as a rear leaf spring which both connects the rear runner to the frame and absorbs shock from the terrain.

The steering assembly includes a rider interface, a front suspension, and a rotational transfer mechanism. The rider interface may include a set of handlebars, foot pedals or similar control devices well known in the art. The steering assembly also includes, linked to the joint, a steering head shaft which is also rotatably connected to a steering head. The rotational transfer assembly is operable connected to the steering head shaft, in order to transfer rotational force from the frame to the front runner(s), so as to adjust the camber angle of the front runner(s) in unison with rotational adjustments to the frame. More particularly, the rotational transfer assembly provides for any change in the lean of the rider support to be likewise transmitted to the front runner(s) so as to change the camber angle thereof This transmission of lean may be carried out by a gear set included in the rotational transfer mechanism. The front suspension is attached to the steering head and includes at least one front runner. The front suspension may also include a front leaf spring that serves both to connect the front runner(s) to the steering assembly and to absorb shock during operation of the vehicle.

The runners on which the personal vehicle of the present invention is mounted may be similar to either snow skis or water skis, depending on the intended use of the vehicle. The runners may also include tracks to which at least one wheel is attached. Thus, the runner-mounted personal vehicle of the present invention may be employed on snow, water and land.

Additional objects and advantages of the invention will become apparent to those skilled in the art from the following written description and the figures relating thereto.

BRIEF DESCRIPTION OF THE DRAWINGS

A better understanding of the invention will be had upon reference to the following description in conjunction with the accompanying drawings in which like numerals refer to like parts throughout the several views and wherein.

DETAILED DESCRIPTION OF THE PREFERRED EMBODIMENT

Figure 1:
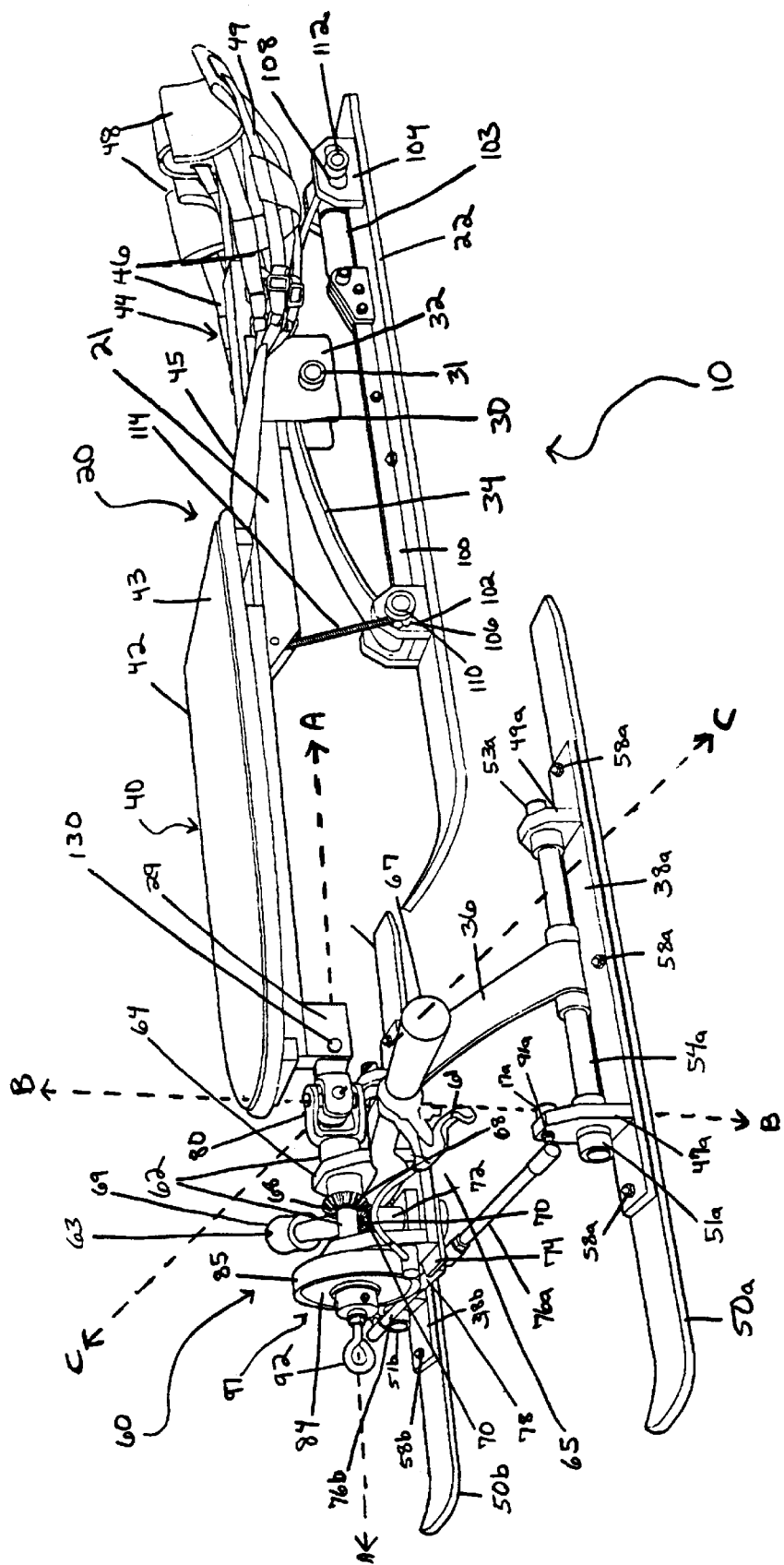
FIG. 1 is a perspective view of a preferred embodiment of the steerable personal vehicle of present invention.

As shown in FIGS. 1–9, the steerable personal vehicle or sled 10 of the present invention includes a frame 20 attached to a steering assembly 60 by a joint 80. The frame includes a rider support 40 upon which a rider (not shown) may be mounted when operating the sled 10. As shown in FIG. 1, the sled 10 may be mounted on a plurality of runners 50a, 50ab and 22 that are attached to both the steering assembly 60 and the frame 20. The weight of the rider and the sled 10 is thereby distributed both along the frame 20 and through the joint 80 to the steering assembly 60. The combination of the joint 80 and the steering assembly 60 provides for at least two, and preferably three, axes of rotation so as to provide a full range of steering capability for use of the sled on land, water and snow.

Figure 2:
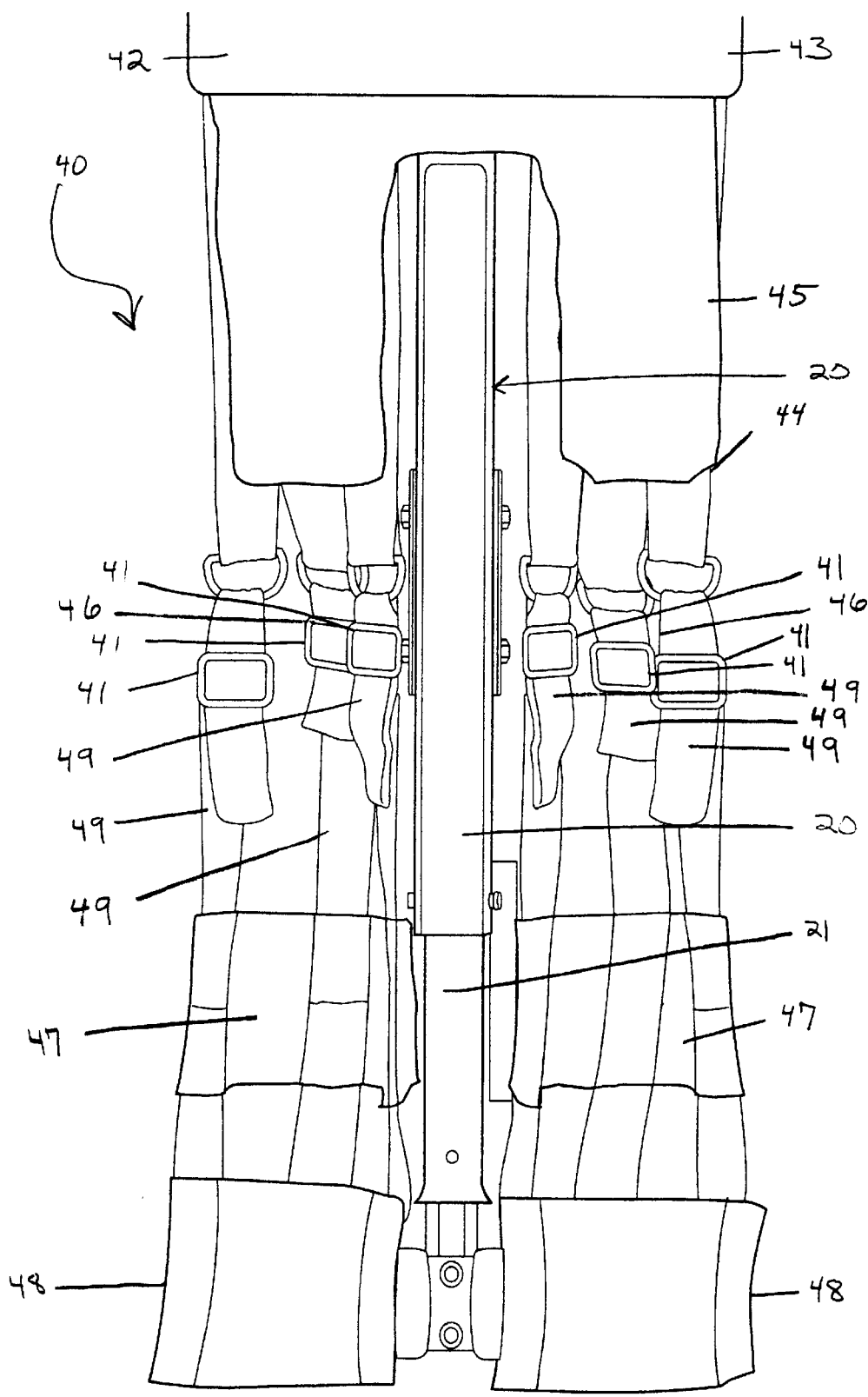
FIG. 2 is a top view of the leg support of the vehicle of FIG. 1.
Figure 3:
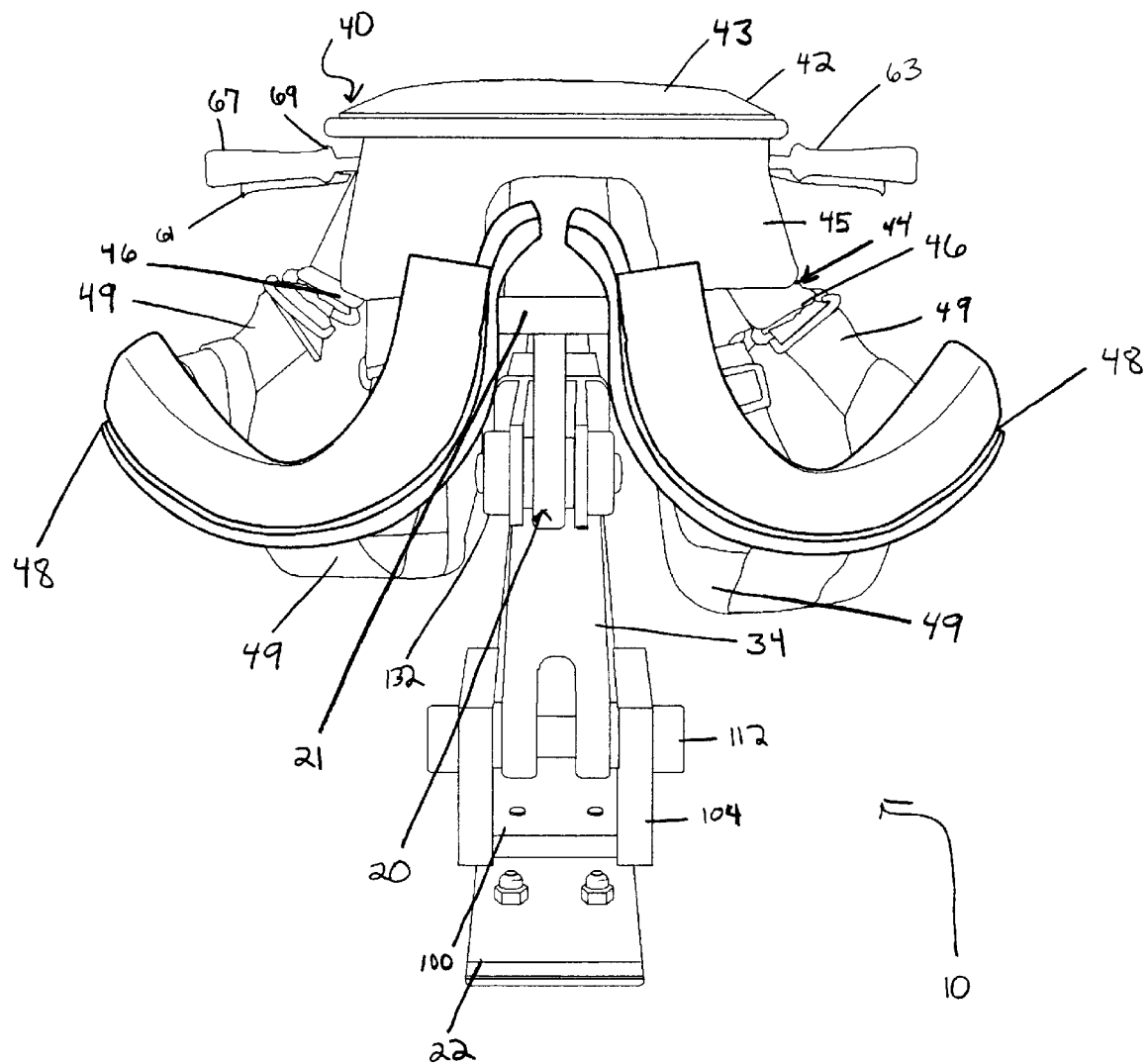
FIG. 3 is a rear view of the vehicle of FIG. 1.

FIG. 1 shows the frame 20 having a rider support 40, a rear suspension 30 and a joint 80 attached thereto. The rider support 40 may include any seat or support device well known in the art. In a preferred embodiment, the rider support 40 includes a torso support 42 and a leg guard 44 aligned therewith. The torso support 42 includes a deck 43 upon which the torso of a rider (not shown) may be aligned in a prone position. The deck 43 may be generally planar, as shown in FIGS. 1 and 3, or the deck 43 may include a molded portion (not shown) that is contoured to provide improved support. The leg guard 44 is aligned adjacent to and rearward of the torso support 42 so as to provide stable support and protection for the rider's lower body. The leg guard 44 may include a thigh support 45, which depends from deck 43, at least one leg sling 46, and at least one shin support 48. As shown in FIGS. 1–3, a preferred embodiment of the leg guard 44 includes two shin guards 48 attached to frame 20 and connected to thigh support 45 by leg slings 46. As shown in FIGS. 1 and 2, thigh support 45 is angled downward from deck 43. Thigh support 45 may be generally planar, as shown in FIG. 3, or may include at least one generally concave portion (not shown) that cups the rider's thighs. Also, moving rearward along frame 20, shin guards 48 are angled upward. As shown in FIG. 3, shin supports 48 are generally concave, so as to receive and hold the rider's shins. The alignment of deck 43 in relation to thigh guard 44 and shin supports 48 allows the torso of a mounted rider to be generally horizontal with the legs directed downward at the thigh by a bend at the waist and directed upward at the shin with a bend at the knee. The body of the rider is thereby in a prone position and draped over and around sled 10, leading to greater stability and control than would be available if the rider was mounted completely above the frame 20. An alternative embodiment of the rider support of the present invention may include a deck (not shown) that is angled downward front to back so that the upper portion of the rider's torso is elevated above the lower portion thereof.

As shown in FIG. 2, the leg slings 46 connect thigh guard 44 to shin supports 48. The present invention may include one leg sling 46, or, preferably, two leg slings 46, as shown in FIG. 2. Leg slings 46 may be formed of any flexible material such as cloth, plastic or nylon and include any well known means for adjusting their depth, such as hook-and-loop type fasteners (not shown) or buckles 41. Straps 49 cooperate to form leg slings 46. Leg slings 46 may also be formed of other webbed material well known in the art. The adjustable aspect of the leg slings 46 allows for rider's of a variety of heights to comfortably ride the sled 10. Leg slings 46 may also include knee pads 47, which provide added comfort and protection to the rider's legs. Knee pads 47, as well in as shin supports 48, may include a soft resilient material, such as foam rubber. Thigh guard 44 and torso support 42 may also include padding to provide comfort and protection to the rider. The rider support 40 of the present invention may be used with a steering assembly 60 having one or more front runners, and preferably two front runners, as shown in FIG. 1. The various embodiments of the rider support 40, shown in FIGS. 1–3 and described herein, may be employed with a personal steerable vehicle, such as sled 10, having a steering assembly 60 and runners 50a, 50b and 22, or may be employed with a differently constructed vehicle which does not have runners or the steering assembly provided herein. More particularly, the rider support 40 may be used with a wheeled vehicle not having runners or with a sled having a differently configured steering mechanism.

Figure 4:
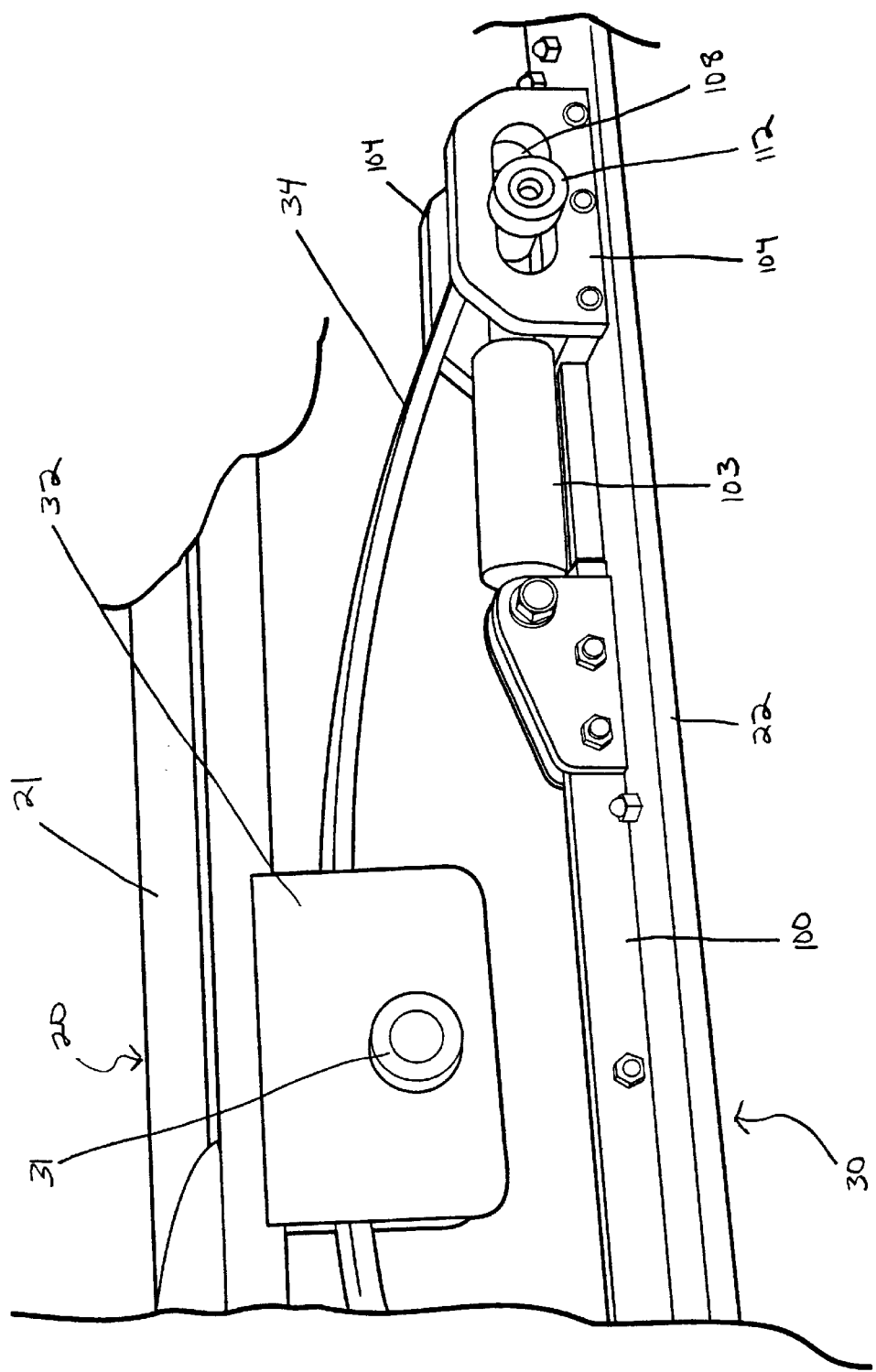
FIG. 4 is a perspective view of the rear suspension of the vehicle of FIG. 1 with selected portions removed.

As shown in FIGS. 1–4, frame 20 includes a rearward longitudinal beam 21 to which both shin supports 48 and rear suspension 30 are attached. In a preferred embodiment, rear suspension 30 includes a mounting bracket 32 attached to beam 21 and connecting a rear leaf spring 34 thereto, as well as at least one rear runner 22. Rear leaf spring 34 is connected to mounting bracket 32 by mounting pin 31, and is, thereby, rotatable relative to mounting bracket 32, so as to allow front-to-back rotation of rear runner 22. Leaf spring 34 is aligned longitudinally with beam 21. A rear pivot bracket 100 has forward pivot flanges 102 and rear pivot flanges 104. FIG. 1 shows forward pivot flanges 102 which have forward pin slots 106 formed therein. FIG. 4 shows rear pivot flanges 104 which rear pin slots 108 formed therein. The rear pivot bracket 100 is affixed to an upper surface of the rear runner 22. As shown in FIG. 4, rear pivot bracket 100 may be aligned longitudinally along the center of rear runner 22. The forward pivot flanges 102 and rear pivot flanges 104 are spaced along the rear runner 22 in order to center the rear pivot bracket 100 along rear runner 22. As shown in FIG. 1, the rear leaf spring 34 is affixed by a forward pin 110 to the pin openings 106 of the forward pivot flanges 102 and slidably affixed by a rearward pin 112 to the pin slots 108 of the rear pivot flanges 104. Acting in concert, the pins 110 and 112 allow deflection of the rear leaf spring 34, while also maintaining rear runner 22 in contact with the terrain. In one embodiment of the present invention, a shock absorber 103 may be attached to rear pivot bracket 100 and be operably connected to rear runner 22, as shown in FIG. 4. Shock absorber 103 is so aligned as to absorb shock transmitted through rear runner 22 from the terrain to the sled 10. Shock absorber 103 thereby provides for smoother handling of the sled 10 than would be available in the absence of shock absorber 103. As shown in FIG. 4, shock absorber 103 may be operably connected between rearward pin 112 and rear pivot bracket 100. Shock absorber 103 may have a relatively short stroke that reduces the flex rate of rear leaf spring 34. The positioning of shock absorber 103 between the ends of rear leaf spring 34 allows for a lower center of gravity than would be available if the shock absorber 103 was located at the point where rear leaf spring 34 is attached to frame 20. Likewise, the positioning of shock absorber 103 allows for rear leaf spring 34 to be attached to frame 20 at only one point, thereby allowing for greater response by the rear suspension 30 to the terrain encountered by the sled 10.

As shown in FIG. 1, a tip retrieval spring 114 is mounted at one end to the forward pivot flanges 102, and at an opposite end to the frame 20 in order to maintain the rear runner 22 tip-high when the sled 10 becomes airborne and before the sled-ski 10 returns to the terrain. Although in the preferred embodiment, the rear runner 22 is longitudinally aligned directly underneath the frame 20, the present invention may include more than one rear runner 22, which are alternatively aligned relative to frame 20.

Figure 5:
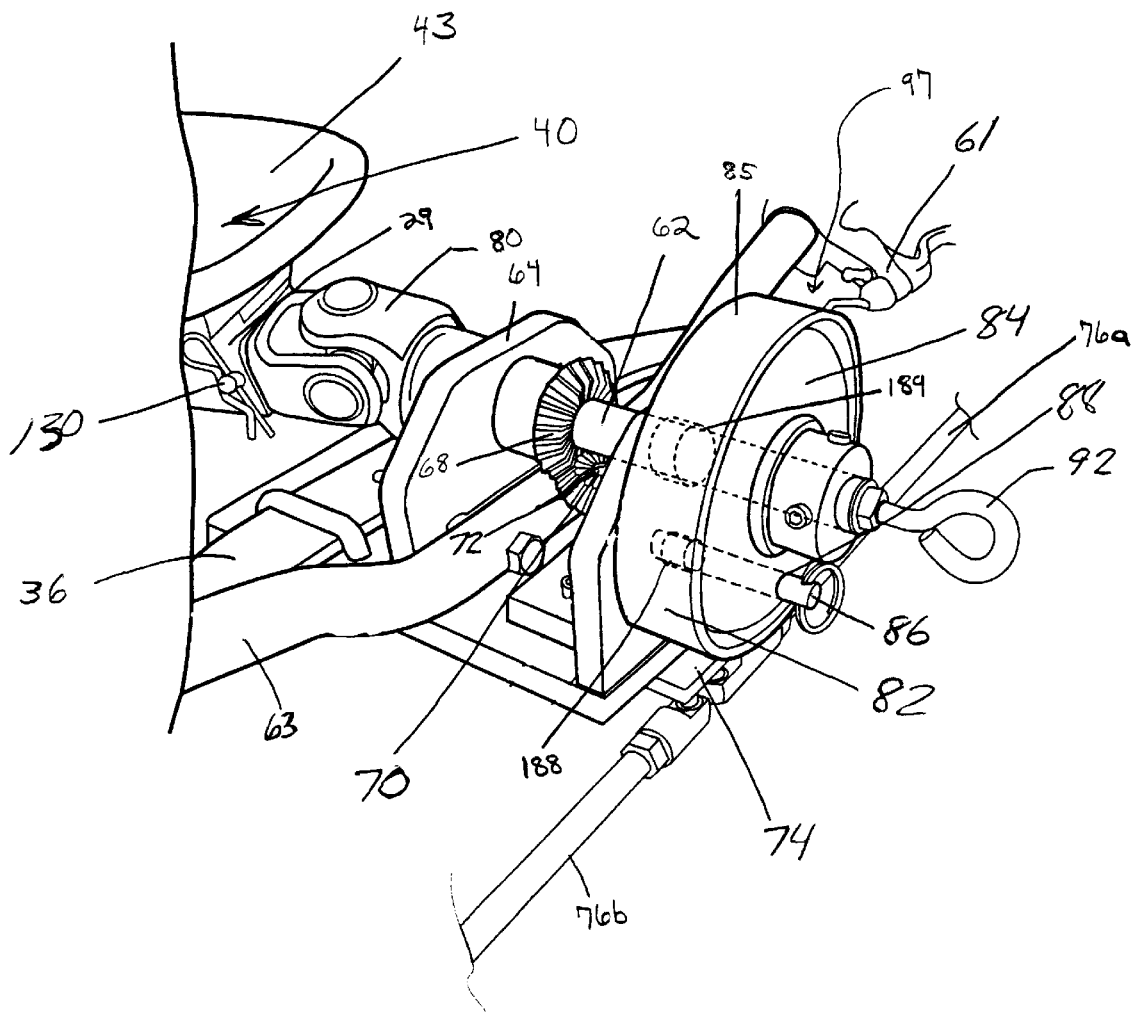
FIG. 5 is a perspective view of the steering assembly of the vehicle of FIG. 1 with selected portions removed and with other selected portions shown in phantom line.
Figure 6:
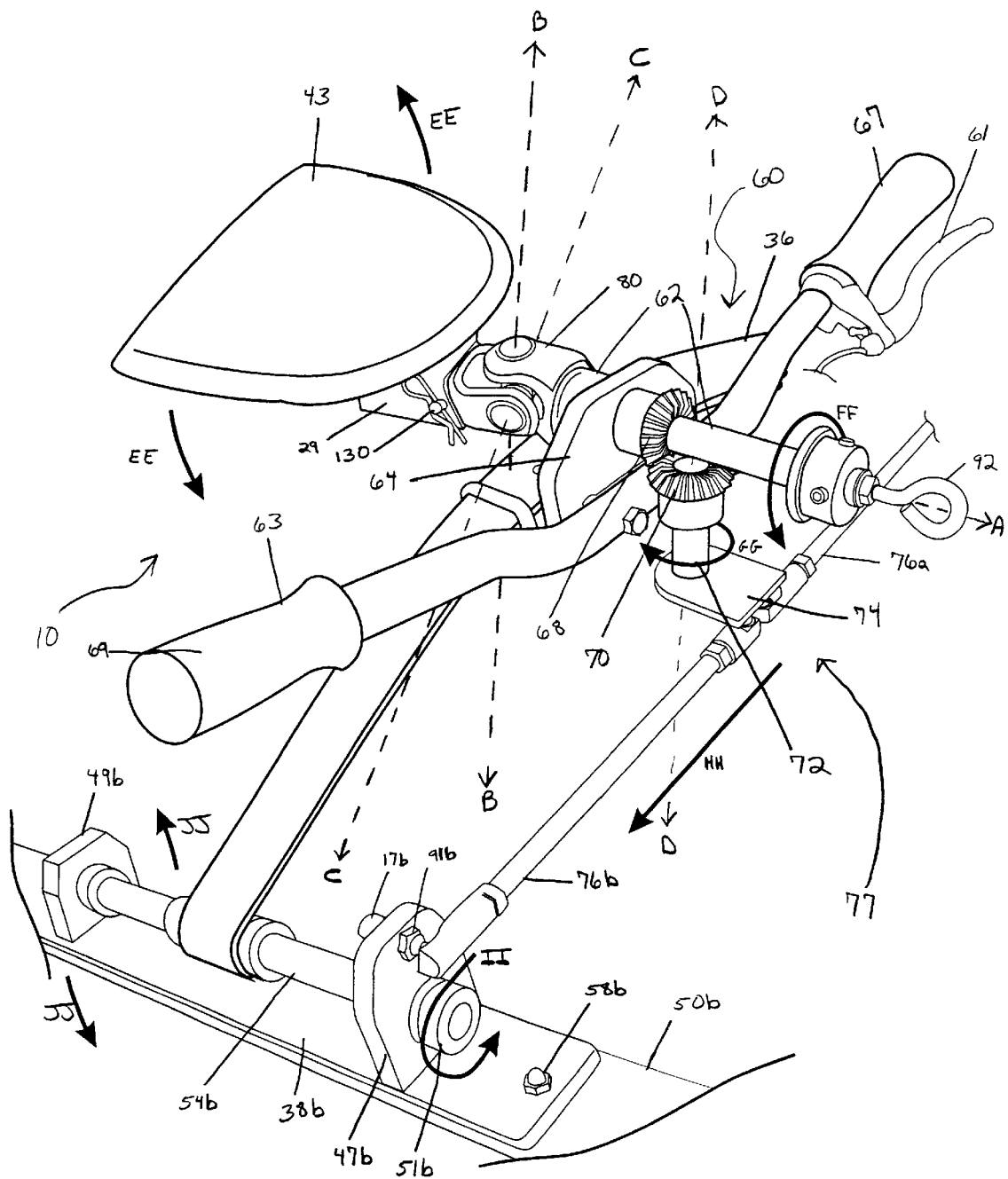
FIG. 6 is a perspective view of the vehicle of FIG. 1 with selected portions removed.
Figure 9:
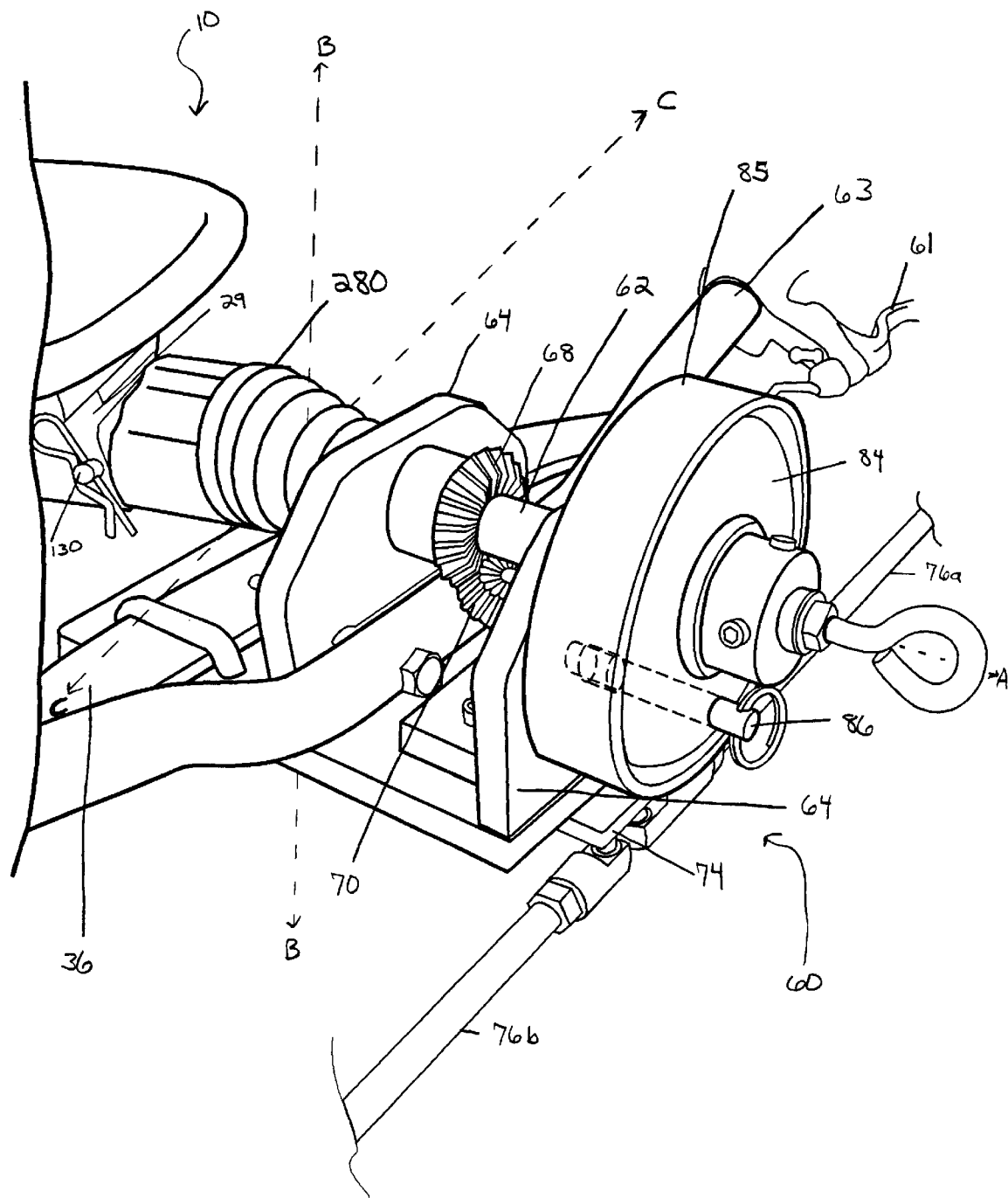
FIG. 9 is a perspective view of another embodiment of the personal vehicle of the present invention.

The steering assembly 60 of the present invention, shown in FIGS. 1, 5 and 6, is connected to the frame 20 by joint 80. Joint 80 may be hinged to rotate about both a horizontal axis C and a vertical axis B, as shown in FIGS. 1 and 6. In a preferred embodiment, joint 80 may be a universal joint 80, as shown in FIGS. 5 and 6 or a constant velocity (CV) joint 280, as shown in FIG. 9. Indeed, joint 80 of the present invention may also include any other type joint well known in the art that allows for rotation about multiple axes. In the preferred embodiments, shown in FIGS. 1, 5, 6 and 9, joint 80 allows for rotation of the steering assembly 60 about three axes, such as axes A, B and C. Joint 80 is attached to both frame 20 and first or steering head shaft 62. Joint 80 maybe removably mounted to frame 20 by any fastener well known in the art such as a clevis separation pin 130, shown in FIGS. 1, 5 and 6. As shown in FIG. 1, a portion of joint 80 is disposed in a housing 29 and secured there by pin 130. The securing of joint 80 within housing 29 provides for distribution of stress and strain to housing 29 and away from joint 80. The separation pin 130 allows quick separation of the steering assembly 60 and joint 80 from frame 20, thereby facilitating the transport of the sled 10 when not in use. The steering assembly 60 includes a front suspension 65 that connects at least one front runner 50a to the steering assembly 60. The steering assembly 60 is mounted on at least one front runner 50a. In a preferred embodiment, the steering assembly 60 is disposed vertically lower than the forward portion of deck 43 of the rider support 40 when the frame 20 is in an upright position, as shown in FIG. 1. This alignment of the steering assembly 60 relative to the rider support 40 serves, among other purposes, to maintain a rider's arms and hands generally below the rider's chest, to remove the steering assembly 60 from the rider's field of vision, and, most importantly, to prevent the rider from becoming entangled in the front suspension 65 when the frame 20 is leaned to one side relative to the steering assembly 60. The sled 10 of the present invention may include one or more front runners 50a and 50b connected to the steering assembly 60 by a front suspension 65.

Figure 8:
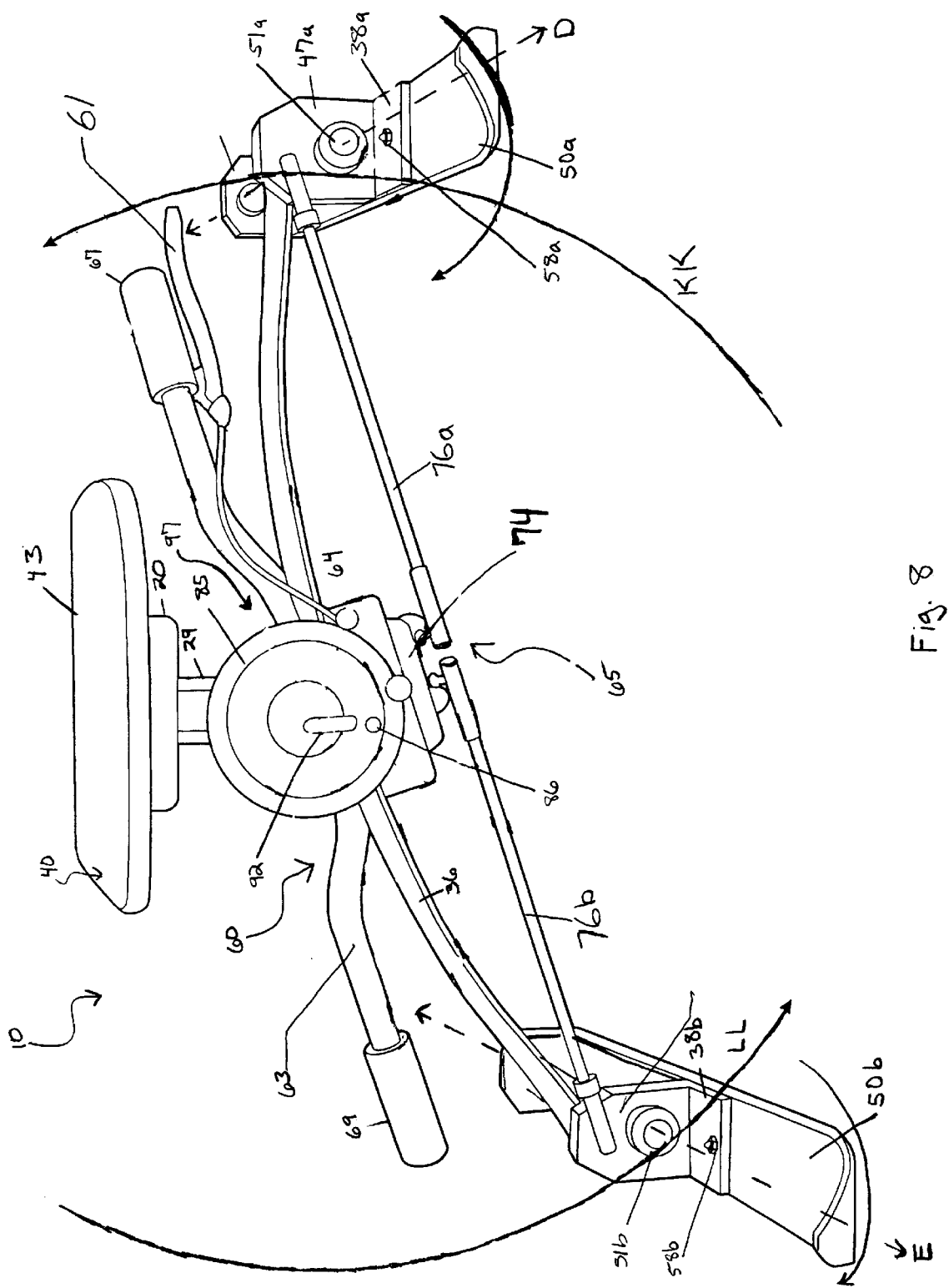
FIG. 8 is a front view of the personal vehicle of the present invention with the steering assembly rotated relative to the frame.

A preferred embodiment of the present invention includes a left front runner 50a and a right front runner 50b attached to the steering assembly 60 by front suspension 65, as shown in FIGS. 1 and 8. Steering assembly 60 is rotatable about a first axis B and a second axis C, as shown in FIGS. 1 and 6. The first axis B and the second axis C may intersect at joint 80, as shown in FIG. 1, or may not intersect (not shown). In a preferred embodiment, the steering assembly 60 is rotatable about first axis B, second axis C and a third axis A, as shown in FIG. 1. Although the three axes A, B, and C shown in FIG. 1 intersect, the sled 10 of the present invention may include three axes of rotation all of which do not intersect.

The front suspension 65 connects the steering assembly to the left front runner 50a and right front runner 50b. Front suspension 65 includes a front leaf spring 36 which connects the remainder of the front suspension 65 to steering assembly 60. Left front runner 50a is attached to front suspension 65 by left front pivot bracket 48a. Left front pivot bracket 48a has two flanges 47a and 49a with pivot shaft openings 51a and 53a formed therein. The left front pivot bracket 38a is affixed to an upper surface of the left front runner 50a and extends upwardly therefrom to laterally pivotably receive a left pivot shaft 54a. The flanges 47a and 49a are spaced along the left front runner 50a in order to center the left pivot shaft 54a over a load center of left front runner 50a. A right front runner 50b is also provided having a similar connection to front suspension 65 by a right pivot bracket 38b, which has flanges 47b and 49b with openings 51b and 53b formed therein. Left front runner 50a and right front runner 50b are attached to left and right pivot brackets 38a and 38b, respectively, by threaded studs 58a and 58b, as shown in FIG. 1, or similar fasteners. A left pivot shaft 54a is friction-fitted to a first end of front leaf spring 36. Likewise, a right pivot shaft 54b is friction-fitted to a second end of front leaf spring 36, as shown in FIGS. 1 and 8. Left pivot shaft 54a connects left front runner 50a to front leaf spring 36 by the attachment of left pivot shaft 54a to left pivot bracket 38a. More particularly, the ends of left pivot shaft 54a are disposed in flanges 47a and 49a. Likewise, right front runner 50b is also attached to front leaf spring 36 by the attachment of right pivot shaft 54b to right pivot bracket 38b by the insertion of the ends of right pivot shaft 54b through flanges 47b and 49b, as shown in FIG. 6. Both left and right front runners 50a and 50b are pivotable about left and right pivot shafts 54a and 54b, respectively, as will be discussed herein below. Accordingly, left front runner 50a and right front runner 50b are pivotably affixed to opposite ends of the front leaf spring 36, and oriented parallel to each other. Although a preferred embodiment of front suspension 65 includes a leaf spring 36 connecting the remainder of the suspension 65 to the steering assembly 60, the present invention does contemplate other suspension mechanisms well known in the art.

Figure 7:
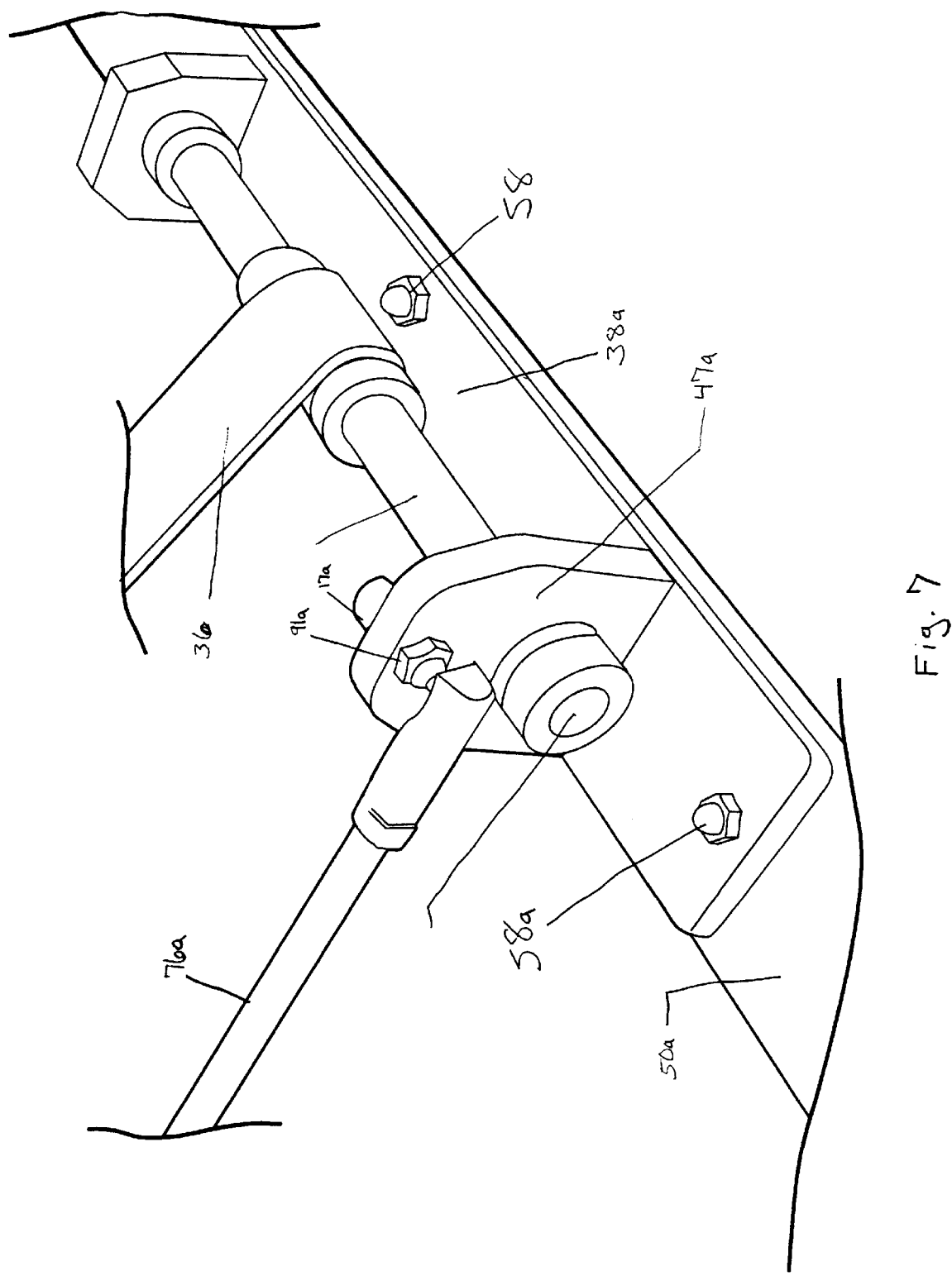
FIG. 7 is a perspective view of the left front runner of the vehicle of FIG. 1 with selected portions removed.

In addition to front suspension 65, steering assembly 60 also includes a steering head 64, which is attached to the first or steering head shaft 62, which, in turn, is connected to joint 80. Steering head 64 may serve as the primary base to which the remainder of the steering assembly 60 is attached. Indeed, as shown in FIGS. 1, 5 and 6, first shaft 62, handle bar set 63, second or camber shaft 72, caliper 85 and front leaf spring 36 are all attached to steering head 64. First shaft 62 extends through steering head 64 at two points as shown in FIG. 5. A first gear 68 is attached to, and may be integrally formed with, first shaft 62. A second gear 70 is both cooperating with first gear 68 and attached to a second or camber shaft 70. First and second gears 68 and 70 may be bevel gears, as shown in FIG. 6, or any other type gear well known in the art that would redirect rotational forces. Second shaft 70 is operably connected to a lever arm 74, which, in turn, operably communicates with both a left steering rod 76a and right steering rod 76b. Left and right steering rods 76a and 76b are attached to flanges 47a and 47b respectively, as shown in FIGS. 6 and 7. More particularly, steering rods 76a and 76b are adjustably and rotatably mounted to the flanges 47a and 47b at a point on each flange above the pivot shaft openings 51a and 51b. The rotational transfer assembly 77 of the present invention includes joint 80, steering head shaft 62, first and second gears 68 and 70, second or camber shaft 70, lever arm 74, left and right steering rods 76a and 76b, and left and right pivot brackets 38a and 38b. The cooperation of these elements as the rider leans the rider support redirects this rotational force from the rider to the left and right front runners 50a and 50b in order to change their camber angles. The adjustment of the camber angles of the left and right front runners 50a and 50b provides more control to the rider and responsiveness from the sled 10.

Handle bar set 63 is attached to steering head 64 and is aligned generally perpendicular to front runners 50a and 50b. Handle bar set 63 serves as a rider interface by which the rider may adjust the direction of sled 10. Other rider interfaces are contemplated by the present invention. For example, other embodiments of the rider interface may include a joystick (not shown), foot pedals (not shown), or other differently configured handle bar sets well known in the art. The rider interface selected is dependent upon the orientation of the rider. If the rider is aligned with feet forward, then foot pedals may be more appropriate, or the handle bar set may extend up and back toward the frame 20.

In a preferred embodiment, shown in FIGS. 1, 5 and 8, a braking assembly 97 is provided in the steering assembly 60, which includes a disc 84 attached to steering head shaft 62, a caliper 85 operably aligned and cooperating with disc 84 and hand brake 61 operably connected to caliper 85. Hand brake 61 is mounted on handle bar set 63 and may be activated by the rider in order to bring caliper 85 into frictional contact with disc 84, thereby inhibiting further rotation of disc 84 relative to steering head 64. The braking assembly 97 provides to the rider further control of the rotational transfer assembly 77 and, therefor, the angle of lean of the frame 20 relative to the steering assembly 60. By applying force to the handbrake 61, the rider may cause the caliper 85 to contract around disc 84, thereby frictionally restraining the rotation of the disc 84. Since disc 84 is integrally formed with steering head shaft 62, restriction of the rotation of the disc 84 likewise restricts rotation of steering head shaft 62. Without rotation of steering head shaft 62, frame 20 remains aligned relative to steering assembly 60, thereby preventing further adjustment of the camber angles of left and right front runners 50a and 50b. As shown in FIG. 5, the operation of rotational transfer assembly 77 may be further limited by the insertion of a locking pin 86 through disc 84 into steering head 64, so as to restrict rotation of steering head shaft 62. Steering head shaft 62 is shown in phantom line disposed through an opening 189 in the forward portion of steering head 64. Locking pin 86 is also shown in phantom line disposed through another opening 188 in steering head 64. When locking pin 86 is so inserted no adjustment of the camber angles of left and right front runners 50a and 50b is possible. The steering assembly 60 may include a towing package as shown in FIG. 5. The towing package may include a pull-ring 92 secured to the end of head shaft 62 by which the sled 10 may be towed.

As shown in FIG. 6, maneuvering of sled 10 includes a plurality of rotations of the components thereof. First, the steering assembly 60 may be rotated about axis B in order to alter the forward direction of the sled 10. The rider rotates steering assembly 60 about axis B using the rider interface provided, such as handle bar set 63. As the rider applies forward pressure to either the left or right hand portions 68 and 69 of handlebar set 63, steering assembly 60 will rotate about axis B at joint 80 relative to frame 20, thereby altering the forward direction of sled 10. As shown in FIG. 1, front leaf spring 36 may be aligned directly below joint 80 so that axis B intersects both joint 80 and front leaf spring 36. Second, the steering assembly may rotate about axis C in order to provide front to rear rotation of at least one front runner 50a. As sled 10 progresses along a forward path, left and right front runners 50a and 50b may respond to changes in terrain elevation by the rotation of the tips thereof in a vertical direction, upward or downward, to maintain contact between the terrain and the steering assembly 60 of sled 10. The rotation of left and right front runners 50a and 50b occurs at joint 80 which is intersected by axis C. The provision of this front to back rotation of left and right front runners 50a and 50b, along with the connection of leaf spring 36 to the front runners, allows for both a reduction in shock distributed to the sled 10 by uneven terrain and the absorption of a significant portion of the shock by the leaf spring 36, thereby providing for a smoother, more controllable ride than would be available in the absence thereof.

The third axis of rotation significant to the operation of the sled 10 is axis A. FIGS. 6 and 8 show the rotations involved in the adjustment of the camber angles of the front runners 50a and 50b and operation of the steering assembly 60. In FIG. 6, rotation of the deck 43 is shown as would occur when a forward facing rider leans to the right. The right side of deck 43 rotates downward, as the left side rotates upward, relative to steering assembly 60, as illustrated by arrows EE. Rotation of deck 43, as shown in FIG. 6, occurs about axis A. The rotation of the deck 43 is distributed through the frame housing 29 and joint 80 to first or head shaft 62. Axial rotation of first or head shaft 62 also occurs, as illustrated by arrow FF, about axis A, which runs there through. Rotation of head shaft 62 causes first gear 68 to rotate in the same direction. Cooperation of first gear 68 with second gear 70 causes second gear 70 to rotate about an axis D, which is perpendicular to head shaft 62 and axis A, as illustrated by arrow GG. Since second gear 70 is attached to second or camber shaft 72, camber shaft 72 also rotates in the same direction about axis D. Rotation of camber shaft 72, in turn, causes the rotation of lever arm 74, which is operably connected thereto. Left and right steering rods 76a and 76b are rotatably connected to lever arm 74 and cooperate with left and right front runners 50a and 50b to change their camber angles. Thus, when lever arm 74 rotates as shown in FIG. 6 both left and right steering rods 76a and 76a are drawn to the right generally toward right front runner 50b, as illustrated by arrow HH. Since both left and right steering rods 76a and 76b are rotatably attached to flanges 47a and 47b, respectively, the movement of left and right steering rods 76a and 76b cause the movement of flanges 47a and 47b. More particularly, steering rods 76a and 76b are rotatably connected to flanges at points 91a and 91b, as shown in FIGS. 6 and 7. The attachment of steering rods 76a and 76b to flanges 47a and 47b may be accomplished by any fastening device, well known in the art, which allows for the rotation of each steering rod relative to each flange, such as a ball-and-socket connection between the steering rods and pins 17a and 17b attached to flanges 47a and 47b at points 91a and 91b, respectively. The point of attachment 91a is positioned on flange 47a such that left front runner 50a is counterposed therewith, so that left front runner 50a may rotate as left steering rod 76a cooperates with flange 47a. As right steering rod 76a moves toward the general direction of right front runner 50b, flange 47b rotates about right pivot shaft 54b, as shown in FIG. 6 and illustrated by arrow II, thereby rotating right pivot bracket 38b and right front runner 50b, which is attached thereto, illustrated by arrows JJ. Since left steering rod 76a also moves in the direction of arrow HH, a similar set of rotations occur along flange 47a, left pivot bracket 38a and left front runner 50a. More particularly, the direction and extent of rotations of flange 47a, left pivot bracket 38a and left front runner 50a are identical to those of flange 47b, as illustrated by arrow II, as well as both right pivot bracket 38b and right front runner 50b, as illustrated by lines JJ. This series of rotations provides for the adjustment of the camber angles of the left and right front runners 50a and 50b. The camber angles of both left and right front runners 50a and 50b are adjusted in unison. The resulting rotation of left and right front runners 50a and 50b place them in parallel planes with each other and, in a preferred embodiment, with deck 43. However, the cooperation of the gears 68 and 70 may be such that the angle of lean of deck 43 may not correspond with the camber angles of left and right front runners 50a and 50b. But even in this case, the camber angles of left and right front runners 50a and 50b will be altered in unison. First shaft 62 may rotate even when the steering assembly 60 a has been rotated about either axis B and/or axis C. Thus, the camber angles of the left and right front runners 50a and 50b may be adjusted even as the handle bar set 63 is being turned by the rider.

Referring to FIG. 8, as the adjustment of the camber angles of the left and right front runners 50a and 50b may be executed by the leaning of deck 43, so to may this adjustment be executed by the rotation of steering assembly 60 relative to frame 20. Should uneven terrain be encountered, the steering head 64 rotates about the first or head shaft 62 and axis A, allowing both front runners 50a and 50b to change their relative positions. As shown in FIG. 8, the uphill front runner 50a rotating upward along curve KK and and the downhill front runner 50b rotating along curve LL. The camber 5 angles of left and right front runners 50a and 50b are adjusted as described above with the left front runner 50a being rotatable about a left longitudinal axis D, which is axially aligned with left pivot shaft 54a and, likewise with right front runner 50b being rotatable about right longitudinal axis E, which is likewise axially aligned with right pivot shaft 54b. Camber shaft 72 will rotate relative to head shaft 62 when front do suspension 65 rotates as shown in FIG. 8. The front runners 50a and 50b are rotatable about the left and right longitudinal axes D and E, respectively, even if alterative pivot means are provided, such as a ball-and-socket configuration to replace the left and right pivot shafts 54a and 54b. Thus, both front runners 50a and 50b follow their respective terrains without transmitting torque to the deck rider support 40 attached to frame 20 and permitting the rider, instead of the terrain, to determine the path of travel of the sled 10. Additionally, rotation of front suspension 65 about head shaft 62 reduces the impact the front leaf spring 36 must absorb, thereby providing a more controllable, comfortable ride. The gear set, including first and second gears 68 and 70, consistently maintains the same camber angles and contact surfaces of both front runners 50a and 50b relative to rear runner 22.

An alternative embodiment of the joint of the present invention is shown in FIG. 9. Joint 280 is a continuous velocity (CV) joint that provides for rotation of the steering assembly 60 about axes A, B and C as described above. Joint 280 is a more complex mechanism than the universal joint provided as joint 80, but provides similar rotational capacity as the universal joint.

The steering assembly 60 of the present invention is contemplated for use on a personal vehicle having a rider support differing from the rider support 40, shown in FIG. 1. More particularly, in addition to a vehicle on which a rider is mounted in a prone position with head forward, the steering assembly 60 may also be used on a vehicle on which a rider is mounted in a seated position or a reclined position with feet forward. The steering assembly 60 may operate on such vehicles in the manner described herein along with small modifications to the rider interface, such as extending the handle bars rearward or providing foot pedals in place thereof.

In use, a rider may mount sled 10 and align his body in a prone position head forward on the rider support 40. The rider's torso is supported by deck 43, while each leg is disposed in leg slings 46. Leg slings 46 may be adjusted to accommodate a rider's size, as well as to optimize comfort and control. Once mounted on the rider support, the rider's legs are slung to each side of frame 20. The rider will also align his hands to contact the rider interface, the handle bar set 63. When the riders's hands are so aligned, the rider's head and shoulders are disposed above steering assembly 60 and front suspension 65, connected thereto. Forward motion may be generated by gravity on an inclined surface, by an external entity towing or pushing, or by the rider pushing off with his legs. As the sled 10 is moving forward, the rider may alter the course of the sled 10 by applying pressure to the handle bar set 63, so as to rotate the steering assembly 60 about axis B. The rider may affect the forward progress of the sled 10 by leaning the deck 43 to either side. Leaning of the deck 43 also causes the frame 20 to lean, thereby altering the camber angle of the rear runner 22, which is attached thereto. The lean generated by the rider is transmitted from the deck 43 to the frame 20 to the housing 29, attached thereto, then to the joint 80, disposed therein. Rotation transmitted from housing 29 to joint 80, in turn, causes first shaft 62 to rotate about axis A. Regardless of whether any part of the sled is rotated about any other axis, rotation of deck 43 will necessarily lead to the rotation of first shaft 62 about axis A. Rotating first shaft 62 causes the rotation of first gear 68, which is integrally formed thereto. First gear 68 cooperates with second gear 72 to cause the rotation thereof. Second shaft 72 rotates with second gear 70 to which it is integrally formed. Lever arm 74 rotates with second shaft 72 to which it is operably connected. Lever arm 74 moves in the direction of the lean of deck 43. More specifically, if the rider leans the deck 43 to the right, then lever arm, in turn, also moves to the right. Steering rods 76a and 76b are operably connected to lever arm 74 and move along therewith. Thus, movement of lever arm 74 to the right moves both left and right steering rods 76a and 76b to the right. Flanges 47a and 47b are likewise moved as the steering rods 76a and 76b move, since they are respectively rotatably connected thereto. Flanges 47a and 47b rotate about left and right pivot shafts 54a and 54b, respectively. Since left and right front runners 50a and 50b are attached to flanges 47a and 47b by left and right front pivot brackets 38a and 38b, runners 50a and 50b also rotate about left and right pivot shafts 54a and 54b, respectively, as flanges 47a and 47b rotate. The rotation of left and right front runners 50a and 50b alters their camber angles. Adjustment of the camber angles of the runners, provides greater control to the rider, especially at high speeds, than would be available simply with rotational adjustments of the front runners 50a and 50b about axis B.

The left front runner 50a has a first camber angle and the right front runner 50b has a second camber angle. Regardless of adjustment of the camber angles of the front runners 50a and 50b, the first camber angle will be equal to the second camber angle. However, depending on the ratio between the first gear 68 and the second gear 70, first and second camber angles may not be equal to the third camber angle belonging to the rear runner 22.

The sled 10 will also respond independently to the changes in terrain in order to optimize stability and handling. Steering head 64 may rotate about first shaft 62 in order to raise one front runner and lower the other front runner in response to uneven terrain. The camber angles of the front runners 50a and 50b will adjust accordingly in the same manner as if the rider leaned the deck 43. The runners 50a, 50b and 22 may also respond to the terrain by rotating front to back. In the case of the front runners 50a 50b, the rotation is about axis C, which intersects joint 80. Whereas, rear runner 22 rotates, along with rear leaf spring 34 about mounting pin 31. Thus, rear runner 22 operates independently of left and right front runners 50a and 50b to adjust for changes in terrain. In the case of a water sled or a sled with runner-mounted wheels, the steering assembly 60 and runners 50a, 50b and 22 may operate in a similar fashion. In the case of runner-mounted wheels, some or all of runners 50a, 50b and 22 may have pluralities of wheels connected in-line thereto. Such pluralities of in-line wheels may be mounted in tracks attached to the runners 50a, 50b and 22, or any other similar apparatus well known in the art. Alternatively, any of the runners 50a, 50b and 22 may have one wheel attached thereto, so that the sled 10 may operate on land.

The detailed description is given primarily for clearness of understanding and no unnecessary limitations are to be understood therefrom for modifications will become obvious to those skilled in the art upon reading this disclosure and may be made without departing from the spirit of the invention and scope of the appended claims.

What is claimed is:

1. A steerable personal vehicle, comprising:
   a frame having a rider support mounted thereon, said rider support including a horizontal torso support; and,
   a steering assembly connected by a joint to said frame, a front suspension connecting at least one front runner to said steering assembly, said steering assembly being rotatable about both a first axis and a second axis, said first axis and said second am axis intersecting at said joint.

2. The steerable personal vehicle of claim 1, a rear suspension connecting at least one rear runner to said frame, said rear suspension being attached to said frame at at least one rearward point of said frame.

3. The steerable personal vehicle of claim 2, said rear suspension including a rear leaf spring connecting said rear runner to said frame, said rear runner being rotatable about an axis transverse to said frame.

4. The steerable personal vehicle of claim 3, said rear leaf spring having a shock absorber operably connected thereto.

5. The steerable personal vehicle of claim 1, said rider support including a torso support and a leg guard.

6. The steerable personal vehicle of claim 5, said leg guard including at least one leg sling.

7. The steerable personal vehicle of claim 1, said joint attached to a forward portion of said frame below said rider support.

8. The steerable personal vehicle of claim 1, said joint being a universal joint.

9. The steerable personal vehicle of claim 1, said steering assembly including a first shaft connecting said steering assembly to said joint, said first shaft being rotatable about a third axis intersecting said first axis and said second axis.

10. The steerable personal vehicle of claim 9, said at least one front runner including a left front runner and a right front runner; and,
    said front suspension including a front leaf spring having a left end and a right end, said left end of said front leaf spring being attached to a left pivot shaft and said right end of said front leaf spring being attached to a right pivot shaft, said left front runner being rotatable about said left pivot shaft and said right front runner being rotatable about said right pivot shaft.

11. The steerable personal vehicle of claim 10, a first gear being attached to said first shaft, said first gear cooperating with a second gear connected to a second shaft, said second shaft operably connected to a lever arm, said lever arm rotatably connected with a left steering rod and a right steering rod, said left steering rod rotatably connected to a right pivot bracket and said right steering rod being rotatably connected to a right pivot bracket, said left front runner being attached to said left pivot bracket and said right front runner being attached to said right pivot bracket.

12. The steerable personal vehicle of claim 11, said first shaft operably connected to a braking assembly.

13. The steerable personal vehicle of claim 12, said braking assembly including a disc attached to said first shaft, said disc cooperating with a caliper operably connected to a hand brake mounted on said steering assembly.

14. The steerable personal vehicle of claim 1, said at least one front runner including a plurality of wheels mounted thereto.

15. A steerable personal vehicle, comprising:
    a frame having a rider support attached thereto, said frame being mounted on a steering assembly and a rear suspension, said steering assembly being attached to said frame by a joint, said steering assembly mounted on at least one front runner, said at least one front runner being connected o said steering assembly by a front suspension, said steering assembly being attached to said frame by a joint, said steering assembly being rotatable about at least two axes, said at least two axes intersecting at said joint, said rear suspension having at least one rear runner attached thereto.

16. The steerable personal vehicle of claim 15, said rider support including a torso support and a leg guard.

17. The steerable personal vehicle of claim 16, said leg guard including two legs slings and two shin supports.

18. The steerable personal vehicle of claim 15, said rear suspension including a rear leaf spring connecting said rear runner to said frame, said rear runner being rotatable about an axis transverse to said frame.

19. The steerable personal vehicle of claim 15, said steering assembly including a steering head and a first shaft, said first shaft being connected to said joint, said steering head being rotatable about said first shaft.

20. The steerable personal vehicle of claim 15, said at least one front runner including a left front runner and a right front runner; and,
    said front suspension including a front leaf spring having a left end and a right end, said left end of said front leaf spring being attached to a left pivot shaft and said right end of said leaf spring being attached to a right pivot shaft, said left front runner being rotatable about said left pivot shaft and said right front runner being rotatable about said right pivot shaft.

21. The steerable personal vehicle of claim 20, a first gear being attached to said first shaft, said first gear cooperating with a second gear connected to a second shaft, said second shaft operably connected to a lever arm, said lever arm rotatably connected with a first and a right steering rod, said left steering rod cooperating with said left front runner and said right steering rod cooperating with said right front runner.

22. The steerable personal vehicle of claim 21, said first shaft operably connected to a braking assembly.

23. The steerable personal vehicle of claim 22, said braking assembly including a disc attached to said first shaft, said disc cooperating with a caliper operably connected to a hand brake mounted on a handle bar set, said handle bar set being attached to said steering assembly.

24. The steerable personal vehicle of claim 15, said at least one front runner including a plurality of wheels mounted thereto.

25. A steerable personal vehicle, comprising:
a frame including a rider support and a joint, said joint connecting said frame to a steering assembly, said steering assembly including a front suspension connecting at least one front runner to said steering assembly, said steering assembly being rotatable about three axes intersecting at said joint.

26. The steerable personal vehicle of claim 25, a rear suspension attached to a rearward portion of said frame, said rear suspension connecting at least one rear runner to said frame.

27. The steerable personal vehicle of claim 26, said rear runner being rotatable about an axis transverse to said frame.

28. The steerable personal vehicle of claim 25, said rider support including a deck and at least one leg sling.

29. The steerable personal vehicle of claim 25, said at least one front runner including a plurality of wheels attached thereto.

30. The steerable personal vehicle of claim 25, said joint being a universal joint.

31. The steerable personal vehicle of claim 25, said steering assembly including a first shaft connecting said joint to said front suspension, said first shaft axially rotatable about one of said three axes.

32. The steerable personal vehicle of claim 31, said at least one front runner including a left front runner and a right front runner; and,
said front suspension including a front leaf spring having a left end and a right end, said left end of said front leaf spring being attached to a left pivot shaft and said right end of said leaf spring being attached to a right pivot shaft, said left front runner being rotatable about said left pivot shaft and said right front runner being rotatable about said right pivot shaft.

33. The steerable personal vehicle of claim 32, a first gear being attached to said first shaft, said first gear cooperating with a second gear connected to a second shaft, said second shaft operably connected to a lever arm, said lever arm rotatably connected with a left steering rod and a right steering rod, said left steering rod cooperating with said left front runner and said right steering rod cooperating with said right front runner.

34. The steerable personal vehicle of claim 33, said first shaft operably connected to a braking assembly.

35. The steerable personal vehicle of claim 34, said braking assembly including a disc attached to said first shaft, said disc cooperating with a caliper operably connected to a hand brake mounted on said steering assembly.

36. A personal vehicle comprising:
a frame mounted on at least one runner and including a rider support attached thereto, said rider support including a torso support, a thigh support depending from said torso support, at least one shin support attached to said frame and at least one leg sling connecting said thigh support and said shin support, said at least one leg sling including a plurality of adjustable straps connecting said thigh support to said shin support.

37. The personal vehicle of claim 36, said torso support including a planar section.

38. The personal vehicle of claim 36, said runner including at least one wheel attached thereto.

39. The personal vehicle of claim 36, said frame attached to a joint connecting said frame to a steering assembly.

40. The personal vehicle of claim 39, a suspension connecting said at least one runner to said steering assembly.

41. The personal vehicle of claim 40, said steering assembly being rotatable through three axes.

42. A steerable personal vehicle comprising:
a frame including a rider support; and,
a steering assembly attached to said frame by a joint, said steering assembly being rotatable about three axes intersecting said joint, a front suspension connecting a left front runner and a right front runner to said steering assembly, said left front runner being rotatable about a left longitudinal axis and said right front runner being rotatable about a right longitudinal axis, said left front runner having a first camber angle and said right front runner having a second camber angle, said first camber angle being equal to said second camber angle.

43. The steerable personal vehicle of claim 42, said rider support including a torso support and a leg guard attached to said frame.

44. The steerable personal vehicle of claim 43, said leg guard including at least one leg sling connecting a thigh support to a shin support.

45. The steerable personal vehicle of claim 42, said joint being a universal joint.

46. The steerable personal vehicle of claim 42, said joint being a continuous velocity.

47. The steerable personal vehicle of claim 42, said frame including a rear suspension having a rear runner attached thereto.

48. The steerable personal vehicle of claim 42, said front suspension including a front leaf spring, a left pivot shaft and a right pivot shaft being attached to said front leaf spring, said left longitudinal axis being axially aligned with said left pivot shaft and said right longitudinal axis being axially aligned with said right pivot shaft, said steering assembly including a steering head, said front leaf spring being attached to said steering head.

49. The steerable personal vehicle of claim 48, said steering assembly including a first shaft connected to said joint, a first gear being attached to said first shaft, said first gear cooperating with a second gear connected to a second shaft, said second shaft operably connected to a lever arm, said lever arm rotatably connected with a left steering rod and a right steering rod, said left steering rod cooperating with said left front runner and said right steering rod cooperating with said right front runner.

50. The steerable personal vehicle of claim 42, said left front runner and said right front runner including a plurality of wheels attached thereto.

51. A sled comprising;
a frame including a rider support attached thereto, said rider support including a torso support and a leg guard depending there from;
said frame mounted on a rear runner, said rear runner attached to said frame by a rear leaf spring;

a steering assembly pivotably attached to a forward portion of said frame by a joint, said steering assembly including a steering head;

said steering assembly rotatable about three axes, said three axes intersecting at said joint;

a front leaf spring mounted to said steering head;

a left front runner pivotably attached to a left pivot shaft, said left pivot shaft rotatably mounted to a left end of said front leaf spring, and a right front runner pivotably mounted to a right pivot shaft, said right pivot shaft rotatably mounted to a right end of said front leaf spring, said left front runner being aligned parallel to said right front runner; and, a handlebar set attached to said steering head.

52. The sled of claim 51, a braking assembly mounted to said steering assembly.

53. The sled of claim 52, said braking assembly including a disc mounted to a first shaft, said first shaft connected to said steering head, said disc cooperating with a caliper mounted to said steering head, said caliper being operably connected to a hand brake mounted to said handlebar set.

54. The sled of claim 53, a locking pin being removably mounted to said braking assembly, said locking pin being disposed in said disc and said steering head.

55. The sled of claim 52, said steering head having a first shaft rotatably attached thereto.

56. The sled of claim 55, said first shaft having a pull ring attached thereto.

57. The sled of claim 52, said rear leaf spring being attached to said rear runner by a forward pin inserted into a forward bracket of a rear pivot bracket a rear pin slidably received within a pin slot in said rear bracket of said rear pivot bracket, said rear pivot bracket being attached to said rear runner.

58. The sled of claim 52, said frame including a tip retrieval spring connecting said frame to said rear pivot bracket.

59. The sled of claim 52, said rear runner being aligned directly below said frame.

60. The sled of claim 52, said steering head assembly being disposed below said rider support.

61. The sled of claim 52, said leg guard including a thigh support depending from said torso support, at least one shin support attached to said frame, and at least one leg sling connecting said thigh support to said shin support.

62. The sled of claim 52, said joint being removably mounted to said frame.

63. The sled of claim 52, said joint being a universal joint.

64. The sled of claim 52, said joint being a constant velocity joint.

65. The sled of claim 52, said steering assembly including a first gear affixed to said first shaft and a second gear cooperating with said first gear, said second gear affixed to a camber shaft, said camber shaft attached to a lever arm operably connected to both a left steering rod and a right steering rod, said left steering rod connected to said left pivot shaft and said right steering rod connected to said night pivot shaft.

* * * * *